United States Patent [19]

Pankratov et al.

[11] 4,194,114
[45] Mar. 18, 1980

[54] DEVICE FOR NON-CONTACT GAUGING OF THICKNESS OR WEIGHT PER UNIT AREA OF SHEET AND LIKE MATERIALS

[75] Inventors: Vladimir I. Pankratov; Gennady P. Konovalenko; Ivan T. Prilipko; Moris L. Gomberg, all of Kiev, U.S.S.R.

[73] Assignee: Ukrainsky Nauchno-Issledovatelsky Institut Tselljulozno-Bumazhoi Promyshlennosti (UKRNIIB), U.S.S.R.

[21] Appl. No.: 866,811

[22] Filed: Jan. 3, 1978

[51] Int. Cl.$^2$ .............................................. G01N 23/00
[52] U.S. Cl. ..................................... 250/308; 250/397
[58] Field of Search ........... 250/306, 307, 308, 358 R, 250/359, 360, 396, 397, 492 B

[56] References Cited

U.S. PATENT DOCUMENTS

| | | | |
|---|---|---|---|
| 3,631,238 | 12/1971 | McDonald | 250/307 |
| 3,928,765 | 12/1975 | Teller | 250/358 R |
| 3,942,017 | 3/1976 | Uehara et al. | 250/492 B |
| 4,115,690 | 9/1978 | Weinstock et al. | 250/308 |

*Primary Examiner*—Davis L. Willis
*Attorney, Agent, or Firm*—Steinberg and Blake

[57] ABSTRACT

The device for non-contact gauging of the thickness of various materials, such as paper, textiles, films and others utilizes the principle of non-contact measurement of said parameter by means of a radioactive source and comprises a radiation source of charged radiation and a radiation detector located on one side of the material to be gauged. The invention is characterized by the fact that the radiation source and the radiation detector are interposed between the poles of a magnetic means. According to one of the embodiments of the invention, the magnetic means comprises two pole sections of which one accommodates the radiation source and the other, the radiation detector, and the section accommodating the radiation source has pole shoes adapted to vary the distance therebetween.

This device features a higher accuracy of measurements, makes it possible to use a low-active radiation source, simplifies radiation protection and reduces the mass and size of the device sensing unit.

4 Claims, 7 Drawing Figures

DEVICE FOR NON-CONTACT GAUGING OF THICKNESS OR WEIGHT PER UNIT AREA OF SHEET AND LIKE MATERIALS

BACKGROUND OF THE INVENTION

The present invention relates to an improvement in devices for non-contact gauging of thickness or weight per unit area of sheet or like materials using radioactive sources, and can be utilized for controlling the production of paper, textiles, films and like materials.

It is to be understood that the sheet materials mentioned herein include not only sheets as such from various materials both flexible and rigid, but also films, strips, as well as hollow articles, wherein the section of a wall being gauged can be considered as a section of a flat body such as a sheet.

Known in the prior art are various devices for non-contact gauging of thickness or weight per unit area of sheet or like materials, also referred to as thickness gauges and weight per unit area gauges. Such devices operate on the principle of measuring the degree to which charged ionizing radiation is absorbed by the material being gauged. They comprises a source of radiation and a detector, placed on opposite sides of the sheet material, and a special scanning means is provided for a synchronous movement of the source of radiation and the detector longitudinally or transversely over the surface of the material. There is a stringent requirement imposed upon such devices that the source of radiation, the detector and the material be kept in an invariably spaced, i.e., fixed relative relationship, because in gauging thin materials the mass of air in the measuring gap is comparable with the mass of the sheet, and any change in the gap, i.e., any displacement of the source relative to the detector in the plane of gauging will cause an inevitable error of gauging. Fulfillment of the requirement results in a more complicated scanning means which involves difficulties in making, mounting and operating the same, thus considerably raising the cost of the entire device.

In gauging sheet materials differing in thickness sources of radiation of different activity and energy have to be used. To provide for sufficient sensitivity of the devices in gauging thin sheets a source of soft (low-energy) radiation is used, whereas in gauging thick plates, sources of hard (high-energy) radiation should be applied.

There are also prior art devices whose operation depends on measuring ionizing radiation back-scattered from the material being gauged. In such devices the radioactive source of radiation and the detector are positioned on one side of the material being gauged, the stability of their arrangement in space being ensured by the rigidity of the detector construction. Though such devices have comparatively simple structural means for synchronous displacement of the source of radiation and the detector, nevertheless they suffer from a number of disadvantages.

Low intensity of back-scattered radiation necessitates the use of highly sensitive detectors which are of low stability and of limited service life.

Additionally, such devices should meet stringent requirements that there be a constant gap between the material and the detector, since a change in the gap will lead to an apparent change in the parameter being measured due to the shift of a portion of the back-scattered radiation beyond the detection zone.

Results of gauging also depend on the composition of the material being gauged.

Known in the art is a device for non-contact gauging of thickness or weight per unit area of sheet and like materials, as disclosed in British Pat. No. 1,338,157.

The above device comprises a source of radiation adapted to produce ionizing radiation and located on one side of the material, a magnetic means for arcuately deflecting the radiation that has passed through the material to enable it to pass through the material in the reverse direction, and a radiation detector to perceive the radiation that has passed through the material and located on the same side of the material as the source of radiation.

This device operates on the principle of measuring the magnitude of double adsorption of the radiation by the material, the detector and the radiation source being arranged on one side of the material being gauged.

The distinguishing feature of the prior art device is that interposed between the radiation source and the detector is a magnet arranged on the same side of the material to be gauged. The magnetic field of the magnet is oriented so that by interacting with particles of the ionizing radiation it deflects them arcuately into the sensing area of the detector and disperses them according to their energy levels. This device as compared with single-pass devices is noted for a higher sensitivity in gauging weight per unit area and a higher accuracy as compared with single-pass devices which is due to the double absorption of the radiation by the sheet material and lesser sensitivity to errors. The device is characterized by a wide range of gauging with the use of only one radiation source, since changes in the gauging ranges are effected by placing the detector in the zone where particles of a predetermined energy level are dispersed in dependence on the thickness of the material, but not by replacing the radiation source.

Both a permanent magnet and an electromagnet can be used as the means producing the magnetic field and the size and location of the magnet with respect to the material are selected so that the optimum induction area of the magnetic field is located on one side of the material being gauged.

However, arrangement of the magnetic system between the radiation source and detector according to the prior art concept makes it impossible to efficiently use the activity of the radiation source, since the magnetic field topography in cur instance is such that low-energy particles which comprise a substantial proportion of the ionizing flux, close in the gap between the magnet poles and do not reach the detector. High-energy particles interact with the magnetic field only on a small portion of their path and the magnetic field intensity is not high enough to deflect the radiation particles passing through the material into the sensitive area of the detector, so they scatter in the space. Thus, the detector registers only medium energy particles of those deflected by the magnet. Therefore, the conventional device for safety reasons is provided with a protective shield having a diaphragm adapted to eliminate the medium energy portion of the spectrum. As a result, the required high-energy radiation sources which are utilized to obtain the required accuracy of gauging necessitates a complicated apparatus for affording protection. The problem of a more efficient use of the activity of the radiation source cannot be solved by increasing the intensity of the magnetic field through the increase of the physical size of the magnet located between the radiation source and the detector, because this will lead in this instance to an increase in the distance between the radiation source and the detector, i.e., to an increased length of the air path through which the radiated particles must travel which would cause a still greater scattering of the deflected radiation flux and would thus adversely affect the accuracy of gauging due to changes in such parameters of the surrounding air as temperature, moisture content and pressure. To reduce the dependence of the results of gauging on variations in the parameters of the radiation source and the environment, provision is made for connecting an additional detector, which detector is located in the zone only of the direct radiation flux and not of that passing through the sheet material. But such additional elements complicate the construction of the device, increase its mass and size and impede the efficient use of the source activity.

SUMMARY OF THE INVENTION

It is an object of the present invention to provide a device for non-contact gauging of thickness or weight per unit area of sheet and like materials, characterized by a higher accuracy of gauging as well as by smaller mass and size.

It is another object of the present invention to provide a device for non-contact gauging of thickness or weight per unit area of sheet and like materials, having a means for the adjustment of the magnetic field intensity depending on the thickness of the material being gauged or on the energy of the radiation source.

It is still another object of the present invention to provide a device for non-contact gauging of thickness or weight per unit area of sheet and like materials, wherein a more efficient use of activity of the ionizing radiation source is achieved.

These and other objects of the present invention are accomplished due to the fact that the radiation source of charged radiation and the radiation detector are interposed between the poles of the magnetic means so that the ionizing radiation flux moves along an arched path and passes twice through the material being gauged.

Such an arrangement of the device for non-contact gauging of thickness or weight per unit area of sheet and like materials makes it possible to locate the radiation source and detector as close to each other as possible which results in a shorter path for the radiation particles in the air, a decrease in the scattering of the radiation flux and the effect of fluctuations of the air parameters, while the magnetic field acting through the entire space over the source substantially increases that part of the radiation flux which is deflected into the detector, thus increasing the accuracy of gauging.

The magnetic means may comprise two pole sections one of which accommodates the radiation source and the other, the radiation detector. The section accommodating the radiation source may be adapted to enable the distance between the poles thereof to be varied which makes it possible to adjust the intensity of the magnetic field in this area in accordance with the thickness of the material being gauged or the energy of the source.

To enable the zone of interaction of the magnetic field with radiation particles to be increased over the entire path of their movement and to achieve therefore the most efficient use of the radiation source, the radiation detector may be made oblong in the direction of the radiation dispersion.

BRIEF DESCRIPTION OF THE ACCOMPANYING DRAWINGS

Other objects and advantages of the present invention will become more apparent from the following detailed description of the embodiments thereof which are represented in the accompanying drawings, wherein:

FIG. 1 schematically represents the device for non-contact gauging of thickness or weight per unit area of sheet and like materials, in accordance with the invention;

DESCRIPTION OF THE PREFERRED EMBODIMENTS

Figure 1:
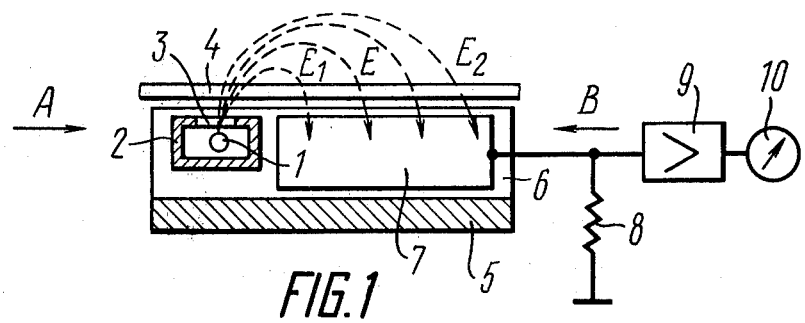
Figure 2:
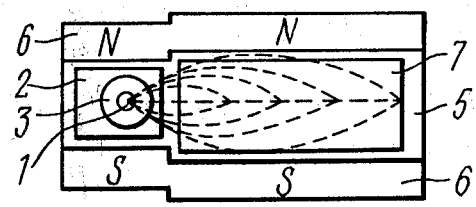
FIG. 2 represents the device of FIG. 1 as viewed from the material being gauged.
Figure 3:
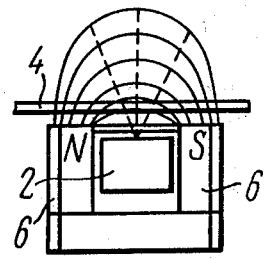
FIG. 3 represents the device of FIG. 1 as viewed in the direction of arrow A.
Figure 4:
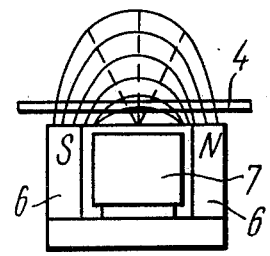
FIG. 4 represents the device of FIG. 1 as viewed in the direction of arrow B.

Referring to the drawings, and particularly to FIGS. 1, 2, the device for non-contact gauging of thickness or weight per unit area of sheet and like materials comprises a radiation source 1 of the conventional type which emits ionizing charged radiation, enclosed in a protective chamber 2 having an aperture 3 and is situated on one side of a material 4 to be gauged. The function of the window or aperture 3 is to direct the radiation to the material 4. Said device also comprises a magnetic means 5 adapted to arcuately deflect the ionizing charged radiation passing through the material 4 to cause it to pass through this material in the opposite direction. The magnetic means 5 has poles such as pole shoes 6. The magnetic means 5 may be either a permanent magnet or an electromagnet. A radiation detector 7 adapted to detect the radiation that has passed through the material 4 in the reverse direction is located on the same side of the material as the radiation source 1. The radiation detector 7 is an ionizing chamber with a load resistor 8 connected to the input of an amplifier 9 whose output is connected directly to a recording device 10.

In accordance with the invention, the radiation source 1 and the radiation detector 7 are interposed between the poles of the magnetic means 5 represented by the pole shoes 6.

Figure 5:
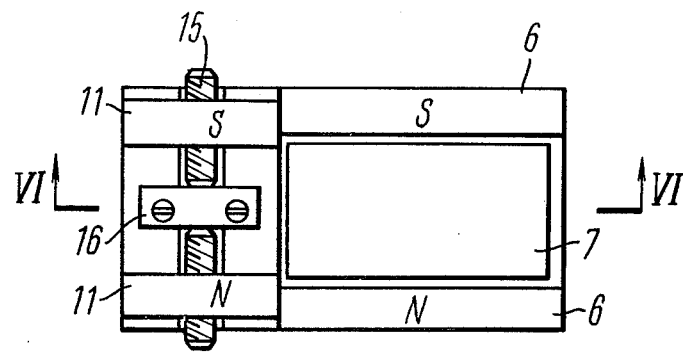
FIG. 5 represents the device for non-contact gauging of thickness or weight per unit area of sheet and like materials, according to another embodiment of the invention as viewed from the material being gauged, wherein the source of ionizing radiation is removed for clarity of representation.
Figure 6:
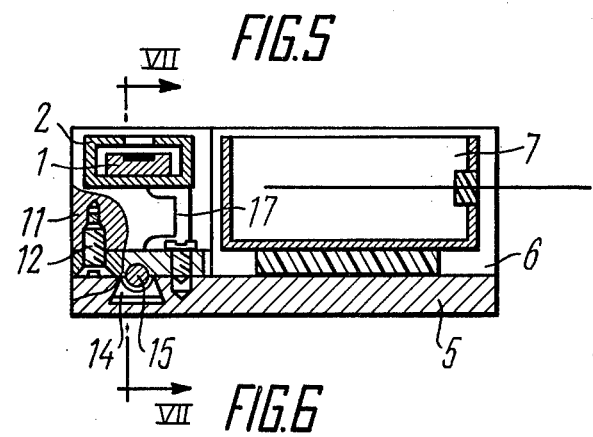
FIG. 6 is a vertical section taken along line VI—VI of the device of FIG. 5.
Figure 7:
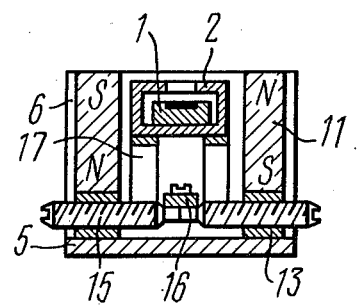
FIG. 7 is a sectional view taken along line VII—VII of the device represented in FIG. 6.

In accordance with one of the embodiments of the present invention represented in FIGS. 5, 6 and 7, the magnetic means 5 contains two pole sections, one of which accommodates the radiation detector 7 and comprises the pole shoes 6, and the other accommodates the radiation source 1 and comprises a pair of pole shoes 11 the distance therebetween adapted to be selectively varied to adjust the intensity of the magnetic field in the area of the radiation source 1. With this aim in view, the pole shoes 11 are mounted with the aid of screws 12 on blocks 13 adapted to slide in a slot 14. The blocks 13 are moved with the aid of a two-way screw 15 passed through the respective right-and lef-hand threaded holes in blocks 13. The screw 15 is checked against axial displacement by means of a strip 16 as is best seen in FIGS. 5 and 7. The radiation source 1 (FIG. 7) is mounted on a support as at 17 represented conventionally as making no part of the invention. The size and strength of the magnetic means 5, the size and shape of the pole shoes 6 and 11, as well as the distance between the pole shoes 11 are selected so that the magnetic field intensity, as well as the zone of interaction thereof with the radiation particles passing through the material 4 could be sufficient for arcuately deflecting the ionizing radiation through the material in the reverse direction toward the radiation detector 7.

According to an alternative embodiment of the invention, the radiation detector 7 and the pole section of the magnetic means accommodating it and the pole shoes 6 are made oblong in the direction of the dispersion of particles as is shown in the accompanying drawings. The above-mentioned radiation detector 7 makes it possible to increase the zone of interaction of ionizing charged radiation particles with the magnetic field, deflect them to the detector and thus utilize the activity of the radiation source with greater efficiency.

Inasmuch as the magnetic field disperses radiation particles according to their energy levels while arcuately deflecting the radiation flux, the drawings illustrate only the middle path thereof for the sake of clarity showing the scattering phenomenon, and in FIG. 1 this is represented as the path ways of these particles corresponding to energy levels $E_1$, $E$, $E_2$, where $E_1$ is the low energy level, $E$ is the medium energy level and $E_2$ is the high energy level.

The device also comprise power sources and other auxiliary units which are neither illustrated in the drawings nor described in detail since they are well known to those skilled in the art.

The principle of operation of the device for non-contact gauging of the thickness or weight per unit area of sheet and like materials is as follows:

Ionizing radiation from the radiation source 1 is directed through the window 3 of the protective chamber 2 onto the material 4 and while passing there through, is partially absorbed therein and enters into the magnetic field produced by the magnetic means 5. In the magnetic field the low energy particles deflect and move along more curved paths, whereas high-energy particles are deflected to a lesser degree and their path ways are less curved. Thus, the particles are dispersed in accordance with their energy levels and are deflected for passing through the material in the reverse direction to impinge against the radiation detector. The degree to which radiation is absorbed depends on the thickness of the material being gauged, so that the degree to which it absorbs radiation particles varies. Thus, the ionizing current in the radiation detector 7, and, consequently, the signal of voltage across the load resistor 8 will vary according to the thickness of the material being gauged. This variation in voltage across the load resistor 8 is recorded through the amplifier 9 by the recording means 10 graduated either in thickness or weight per unit area units.

The device, according to the invention, due to the above-described arrangement of the radiation source and the radiation detector, makes it possible to bring them together as close as practicable. This arrangement increases the accuracy of gauging which results from the fact that the radiation particles in their path of travel from the radiation source to the detector traverse a shorter distance, and any errors caused by changes in environmental parameters, such as air temperature, pressure, humidity, etc. decrease, whereas the efficiency of utilization of the activity of the radiation source increases due to the increased zone of interaction of the magnetic field with the particles along the entire path thereof, thus enabling both low-energy and high-energy radiation to be efficiently used. In the above-described device use can be made of a low-activity radiation source, a small-size detector and magnetic means. This in turn simplifies radiation protection, thereby reduced the mass and size of the thickness gauge comprising a radiation source, radiation detector and magnetic means.

While the device for non-contact gauging of thickness or weight per unit area of sheet and like materials has been described herein in terms of the preferred embodiments, numerous variations may be made therein without departing from the spirit and scope of the invention as set forth in the appended claims.

What is claimed is:

1. A device for non-contact gauging of thickness or weight per unit area of sheet materials, comprising radiation source means for producing charged ionizing radiation located on one side of the material, magnetic means including at least one pair of magnetic poles for arcuately deflecting the radiation that has passed through the material to enable it to pass through the same material in a reverse direction, a radiation detector to perceive the radiation that has passed through the material in the reverse direction, said detector being located on the same side of the material as said radiation source means, said radiation source means and said radiation detector being interposed between the poles of said magnetic means.

2. A device as claimed in claim 1, wherein the magnetic means includes two pole sections of which one accommodates the radiation source and the other, the radiation detector.

3. A device as claimed in claim 2, wherein the magnetic means pole section accommodating the radiation source means includes pole shoes, said device further including means for selectively varying the distance between said pole shoes.

4. A device as claimed in claim 2, wherein the magnetic means pole section accommodating the radiation detector and the radiation detector proper have a substantially oblong shape in the direction of the radiation dispersion.

* * * * *